US009367125B2

(12) United States Patent
Gao et al.

(10) Patent No.: US 9,367,125 B2
(45) Date of Patent: Jun. 14, 2016

(54) TERMINAL APPARATUS FOR SHOOTING AND DISTRIBUTING VIDEO DATA AND VIDEO-DATA DISTRIBUTION METHOD

(71) Applicant: Lenovo (Beijing) Co., Ltd., Beijing (CN)

(72) Inventors: Feng Gao, Beijing (CN); Chentao Yu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 13/954,281

(22) Filed: Jul. 30, 2013

(65) Prior Publication Data
US 2014/0036098 A1 Feb. 6, 2014

(30) Foreign Application Priority Data

Jul. 31, 2012 (CN) .......................... 2012 1 0270692

(51) Int. Cl.
*H04N 5/232* (2006.01)
*G06F 3/00* (2006.01)
*H04N 21/2743* (2011.01)
(Continued)

(52) U.S. Cl.
CPC ............ *G06F 3/005* (2013.01); *H04N 21/2743* (2013.01); *H04N 21/4223* (2013.01); *H04N 21/4402* (2013.01)

(58) Field of Classification Search
CPC ....... H04N 1/00148–1/00159; H04N 1/00228; H04N 1/00244; H04N 1/2179; H04N 1/2191
USPC .......................................... 348/211.1–211.4
See application file for complete search history.

(56) References Cited

U.S. PATENT DOCUMENTS 7,505,045 B2 * 3/2009 Clark ............................ 345/601
7,987,492 B2 * 7/2011 Liwerant et al. ............... 725/115
8,339,500 B2 * 12/2012 Hattori ................. G11B 27/034
248/207.1

(Continued)

FOREIGN PATENT DOCUMENTS

| CN | 101184195 | 5/2008 |
| CN | 101529848 | 9/2009 |
| CN | 102447893 | 5/2012 |

OTHER PUBLICATIONS

First Office Action dated Feb. 15, 2016 out of corresponding Chinese Priority Application 201210270692.2 (12 pages including English translation).

*Primary Examiner* — Ngoc-Yen Vu
(74) *Attorney, Agent, or Firm* — Brinks Gilson & Lione; G. Peter Nichols

(57) ABSTRACT

A terminal apparatus and a video-data distribution method thereof are described. The terminal apparatus includes a camera module, configured to shoot a video and generate raw data associated with the shot video in real time; an encoding-and-packaging unit configured to encode the raw data to produce encoded video data, and package the video data at a predefined time interval to produce a plurality of first-video clip data with a predetermined format, wherein the plurality of first-video clip data can all be played independently. The apparatus can include a first communication unit, configured to communicate with a remote server, wherein the server is a hypertext-transfer-protocol server and supports other terminal apparatuses to download the first-video clip data; and a first processing unit, configured to upload the produced plurality of first-video clip data to the server in real time via the first communication unit.

16 Claims, 1 Drawing Sheet

(51) Int. Cl.
*H04N 21/4223* (2011.01)
*H04N 21/4402* (2011.01)

(56) References Cited

U.S. PATENT DOCUMENTS

| | | | | |
|---|---|---|---|---|
| 8,627,075 B2* | 1/2014 | Ikeda | ............... | H04B 5/02 |
| | | | | 455/41.1 |
| 8,982,220 B2* | 3/2015 | Schultz et al. | ............... | 348/207.1 |
| 9,225,760 B2 | 12/2015 | Ralston | | |
| 2007/0016680 A1* | 1/2007 | Burd et al. | ............... | 709/227 |
| 2008/0072261 A1 | 3/2008 | Ralston | | |
| 2009/0144657 A1* | 6/2009 | Zhang | ............... | H04L 51/38 |
| | | | | 715/810 |
| 2011/0246659 A1* | 10/2011 | Bouazizi | ............... | 709/231 |
| 2012/0250755 A1* | 10/2012 | Ratner | ............... | H04N 19/436 |
| | | | | 375/240.01 |
| 2013/0120592 A1* | 5/2013 | Bednarczyk | ............... | H04N 5/765 |
| | | | | 348/207.1 |

\* cited by examiner

TERMINAL APPARATUS FOR SHOOTING AND DISTRIBUTING VIDEO DATA AND VIDEO-DATA DISTRIBUTION METHOD

This application claims priority to Chinese patent application No. 201210270692.2 filed on Jul. 31, 2012 the entire contents of which is incorporated herein by reference.

The present invention relates to a terminal apparatus and a video-data distribution method.

BACKGROUND

With continuous development of performances and functions of terminal apparatuses such as smart phones or tablet computers, more and more users use these types of terminal apparatuses frequently to shoot or record some scenes or events, and share these scenes or events via applications such as microblogs and the like. At present, applications such as microblogs and the like can only share texts or static images in real time, but can not share dynamic images shot by a user in real time with other terminal apparatuses (e.g., for playing videos shot by the user on live).

SUMMARY

To solve the above-mentioned technical problems, according to one aspect of the present invention, there is provided a terminal apparatus, which comprises: a camera module, configured to shoot a video, and generate raw data associated with the shot video in real time; an encoding-and-packaging unit, configured to encode the raw data to produce encoded video data, and package the video data at a predefined time interval to produce a plurality of first-video clip data with a predetermined format, wherein the plurality of first-video clip data can all be played independently; a first communication unit, configured to communicate with a remote server, wherein the server is a hypertext-transfer-protocol (http) server and supports other terminal apparatuses to download the first-video clip data; and a first processing unit, configured to upload the produced plurality of first-video clip data to the server in real time via the first communication unit.

In addition, according to an embodiment of the present invention, the server further comprises: a second communication unit, configured to communicate with the terminal apparatus, and receive the plurality of first-video clip data from the terminal apparatus; a storage unit, configured to store the plurality of first-video clip data; and a second processing unit, configured to store first one of the first-video clip data in the storage unit when it is determined that the server receives the first one of the first-video clip data from the terminal apparatus, and generate a network-address file for obtaining the first one of the first-video clip data as well as the subsequent first-video clip data, and store the subsequent first-video clip data, received by the second communication unit, in the storage unit.

In addition, according to an embodiment of the present invention, the second processing unit of the server sends the network address of the network-address file to the terminal apparatus via the second communication unit; and the terminal apparatus sends the network address of the network-address file to at least one of predetermined other terminal apparatuses.

In addition, according to an embodiment of the present invention, the second processing unit of the server sends the network address of the network-address file to at least one of predetermined other terminal apparatuses via the second communication unit.

In addition, according to an embodiment of the present invention, the other terminal apparatuses, based on the network-address file, download sequentially from the server and play the plurality of first-video clip data.

In addition, according to an embodiment of the present invention, the second processing unit, based on the first-video clip data, produces second-video clip data with a different bitrate, and based on the first-video clip data as well as the second-video clip data, generates a network-address file, wherein the first-video clip data and the corresponding second-video clip data have the same content; and the other terminal apparatuses, based on a communication environment, select addresses of the video clip data suitable for the communication environment from the network-address file, and download sequentially from the server and play the selected video clip data.

Moreover, according to another aspect of the present invention, there is provided a video-data distribution method, applied to a terminal apparatus comprising a camera module, an encoding-and-packaging unit and a first communication unit, the method comprising: with the camera module, a video is shot and raw data associated with the shot video is generated; with the encoding-and-packaging unit, the raw data is encoded to produce encoded video data, and the encoded video data is packaged at a predefined time interval to produce a plurality of first-video clip data with a predetermined format, wherein the plurality of first-video clip data can all be played independently; and, via the first communication unit, communication is established with a server, and the produced plurality of first-video clip data is uploaded to the server in real time, wherein the server is a hypertext-transfer-protocol server and supports other terminal apparatuses to download the first-video clip data.

In addition, according to an embodiment of the present invention, wherein the server further comprises a second communication unit and a storage unit, the method further comprises: the plurality of first-video clip data from the terminal apparatus is received via the second communication unit; when it is determined that the server receives first one of the first-video clip data from the terminal apparatus, the first one of the first-video clip data is stored in the storage unit, and a network-address file is generated for obtaining the first one of the first-video clip data as well as the subsequent first-video clip data; and the subsequent first-video clip data, received by the second communication unit, is stored in the storage unit.

In addition, according to an embodiment of the present invention, the method further comprises: the network address of the network-address file is sent to the terminal apparatus via the second communication unit; and the terminal apparatus sends the network address of the network-address file to at least one of predetermined other terminal apparatuses.

In addition, according to an embodiment of the present invention, the method further comprises: the network address of the network-address file is sent to at least one of predetermined other terminal apparatuses via the second communication unit.

In addition, according to an embodiment of the present invention, the method further comprises: the other terminal apparatuses, based on the network-address file, download sequentially from the server and play the first-video clip data.

In addition, according to an embodiment of the present invention, the method further comprises: based on the first-video clip data, second-video clip data is produced with a different bitrate, and based on the first-video clip data as well as the second-video clip data, a network-address file is generated, wherein the first-video clip data and the corresponding second-video clip data have the same content; and the other terminal apparatuses, based on a communication environment, select addresses of the video clip data suitable for the communication environment from the network-address file, and download sequentially from the server and play the selected video clip data.

DETAILED DESCRIPTION

Figure 1:
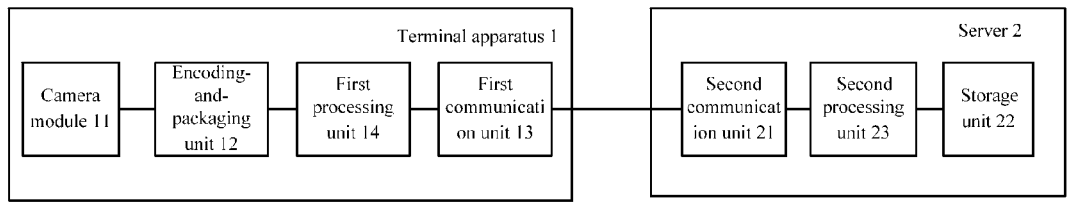
FIG. 1 is a schematic diagram illustrating a terminal apparatus and a server in accordance with an embodiment of the present invention.

Various embodiments of the present invention will be described in detail with reference to the accompanying drawing. Here, it should be note that, in the drawings, same reference numerals will be given to integral components having substantially the same or similar structures and functions, and repeated description about them will be omitted.

Below, with reference to FIG. 1, a terminal apparatus in accordance with an embodiment of the present invention will be described. Here, the terminal apparatus in accordance with the embodiment of the present invention may be a terminal apparatus, such as a smart phone, a tablet computer or a laptop computer and the like.

As shown in FIG. 1, the terminal apparatus 1 in accordance with the embodiment of the present invention may comprise: a camera module 11, an encoding-and-packaging unit 12, a first communication unit 13 and a first processing unit 14.

Here, the camera module 11 may be implemented by any camera module, and can shoot images and videos, and can generate raw data associated with the shot video (including dynamic pictures and audios) in real time during video-shooting.

The encoding-and-packaging unit 12 may encode the raw data generated by the camera module 11, to produce encoded video data (e.g., video data based on H264 and AAC). In addition, the encoding-and-packaging unit 12 can also package the video data at a predefined time interval (e.g., 1 second), to produce a plurality of first-video clip data with a predetermined format. For example, the first-video clip data may be a streaming-media file, such as a TS file and the like. In this case, each first-video clip data among the plurality of first-video clip data produced by the encoding-and-packaging unit 12 can all be played independently by a terminal apparatus which supports a streaming-media-play function. Here, the encoding-and-packaging unit 12 may be implemented by dedicated hardware-encoding-unit-and-packaging-unit, and also may be implemented by the first processing unit 14 (e.g., a CPU) of the terminal apparatus in combination with encoding software and video-stream packaging software.

The first communication unit 13 may communicate with a remote server. Here, the first communication unit 13 may comprise, for example, a 3G module, a Wifi module, and the like communicate module. According to the embodiment of the present invention, the server may be a hypertext-transfer-protocol server (HTTP server). The server supports other terminal apparatuses (e.g., PCs, TVs, laptops, tablets, mobile phones, etc.) to download the first-video clip data.

The first processing unit 14 may be implemented by any processor or microprocessor. Here, under the control of the video-share application in accordance with the embodiment of the present invention, the first processing unit 14 may, during a user's video-shooting, encode the raw data generated by the camera module 11 to produce encoded video data with the encoding-and-packaging unit 12, and package the video data at a predefined time interval (e.g., 1 second) to produce the plurality of first-video clip data with a predetermined format. Then, the first processing unit 14 uploads the produced plurality of first-video clip data in real time (sequentially) to the server via the first communication unit 13.

Below, the structure and function of the sever in accordance with the embodiment of the present invention will be described.

As shown in FIG. 1, the server 2 may comprise: a second communication unit 21, a storage unit 22 and a second processing unit 23. Here, the server may be a HTTP server. The server supports other terminal apparatuses (e.g., PCs, TVs, laptops, tablets, mobile phones, etc.) to download and play the first-video clip data in the form of video-streaming data via HTTP protocol.

Here, the server 2 may communicate with the terminal apparatus 1 via the second communication unit 21, and may receive the plurality of first-video clip data from terminal apparatus 1 via the second communication unit 21.

The storage unit 22 may store the plurality of first-video clip data received from the terminal apparatus 1.

The second processing unit 23 may perform preset operations under the control of a preset program. According to the embodiment of the present invention, the second processing unit 23 may store first one of the first-video clip data in the storage unit 22 when it is determined that the server 2 receives the first one of the first-video clip data from the terminal apparatus 1 and generate a network-address file for obtaining the first one of the first-video clip data as well as the subsequent first-video clip data, and store the subsequent first-video clip data, received by the second communication unit 21, in the storage unit 22. Specifically, when the second processing unit 23 determines that the server 2 receives the first one of the first-video clip data from the terminal apparatus 1, the second processing unit 23 stores the first one of the first-video clip data in the storage unit 22. At this time, the second processing unit 23, based on the received first one of the first-video clip data, generates a network-address file for obtaining (downloading) the first one of the first-video clip data (e.g., xxx.m3u8). Here, the network-address file may be a download-boot file like a M3U8 file, and in the download-boot file, there is contained a network address (i.e. a link, such as http://xxxxxx.com/1.TS) for obtaining the first one of the first-video clip data. Then, when the second processing unit 23 receives the subsequent first-video clip data, the second processing unit 23 stores the subsequent first-video clip data in the storage unit 22, and based on the received subsequent first-video clip data, generates a network-address file for obtaining the first one of the first-video clip data as well as the subsequent first-video clip data. For example, the second processing unit 23 may generate the network-address file (e.g., a m3u8 file) in such a way that the network addresses of the subsequent first-video clip data update the network-address file. In this case, the updated network-address file may contain the network addresses (e.g., http://xxxxxx.com/1.TS, http://xxxxxx.com/2.TS . . . ) of the first one of the first-video clip data as well as the subsequent first-video clip data; moreover, the sequence (the downloading or playing sequence) of the network addresses of the first one of the first-video clip data as well as the subsequent first-video clip data is consistent with the generation sequence of the first-video clip data.

In this case, according to one embodiment of the present invention, the second processing unit 23 may send the network address (a link, such as http://xxxxxx.com/xxx.m3u8)

of the network-address file to the terminal apparatus 1 via the second communication unit 21. In this case, the terminal apparatus 1 may send the network address of the network-address file to at least one of predetermined other terminal apparatuses. Specifically, after the terminal apparatus 1 receives the network address of the network-address file, the first processing unit 14 may, via the display screen (not shown) of the terminal apparatus 1, display contact information such as contacts, microblog friends, QQ friends and the like information for a user to select, and after the user's selection, the network address (e.g., http://xxxxxx.com/xxx.m3u8) of the network-address file is sent (e.g., in the form of SMS or qq messages) to a specified other user (terminal apparatus) via the first communication unit 13.

In addition, according to another embodiment of the present invention, the server 2 also may, with the use of any push technology, send the network address of the network-address file to at least one of predetermined other terminal apparatuses. The second processing unit 23 of the server 2 may send the network address of the network-address file to at least one of predetermined other terminal apparatuses via the second communication unit 21. Specifically, the user of the terminal apparatus 1 may upload a specified contact list or friends list through the terminal apparatus 1 to the server 2 in advance. In this case, when the server 2 receives the first one of the first-video clip data from terminal apparatus 1, the server 2 may, based on the acquired identification (ID) of the terminal apparatus 1 or the identification of the uploader when establishing connection with the terminal apparatus 1, determine a corresponding contact list or friends list, and after the second processing unit 23 has generated a network-address file, the second processing unit 23 may push the network address of the network-address file to at least one of predetermined other terminal apparatuses among the contact list or friends list, via the second communication unit 21.

After the network address of the network-address file is pushed directly by the server 2 or sent through the terminal apparatus 1 to at least one of other terminal apparatuses, the other terminal apparatuses may, based on the network address (e.g., http://xxxxxx.com/xxx.m3u8) of the network-address file, obtain the network-address file (e.g., xxx.m3u8), and may, based on the network-address file, download sequentially from the server 2 and play the plurality of first-video clip data. Here, the other terminal apparatuses are terminal apparatuses which support to download from the server 2 and play streaming media, and the other terminal apparatuses encompass most of smart phones, tablet computers and PC devices. Specifically, when the users of other terminal apparatuses have selected the network address of the network-address file, other terminal apparatuses then, based on the network address of the network-address file, obtain the network-address file, and obtain the network addresses of the plurality of first-video clip data contained in the network-address file, and further based on the network addresses of the plurality of first-video clip data, download sequentially in the form of streaming media from the server 2 and play the plurality of first-video clip data. Here, since the plurality of first-video clip data is downloaded and played in the form of streaming media, other terminal apparatuses need to poll the server 2 whether or not the playing of the video has completed. For example, other terminal apparatuses check (poll) at a predefined time interval whether or not there is new content in the network-address file; if there are network addresses of new first-video data, then other terminal apparatuses continue to play the video until the playing of all first-video data in the network-address is completed.

In this case, since the user of the terminal apparatus 1 generates first-video data at a predetermined short time interval (e.g., 1 second) during shooting and uploads the first-video data, and the second processing unit 23 of the server 2 generates a network-address file based on the first-video data and transmits the network address of the network-address file directly (or through the terminal apparatus 1) to other terminal apparatuses, thus the users of other terminal apparatuses only need to wait a very short period of time to be able to watch the video shot by the terminal apparatus 1, without the need of waiting until the user of the terminal apparatus 1 completes shooting. In this case, such a function is achieved that users of other terminal apparatuses watch the live-playing videos of the terminal apparatus 1, and user-experience is greatly improved.

Moreover, according to another embodiment of the present invention, the second processing unit 23 also may, based on the first-video clip data, generate second-video clip data with a different bitrate, and based on the first-video clip data as well as the second-video clip data, generate a network-address file. Here, the first-video clip data and the corresponding second-video clip data have the same content. For example, if the first-video clip data are high-definition videos, then, in order to meet the needs of a different communication environment of other terminal apparatuses, the second processing unit 23 also converts the first-video clip data (e.g., 720 P) into the second-video clip data with a different bitrate (e.g., 480 P). In addition, for example, if the first-video clip data are standard-definition videos, then the second processing unit 23 also may convert the first-video clip data (e.g., 480 P) into the second-video clip data with a different bitrate (e.g., 720 P). Then, the second processing unit 23, based on the first-video clip data as well as the second-video clip data, generates a network-address file. For example, in the network-address file, there may contain network addresses of the data of two groups of video clips (the first-video clip data and the second-video clip data).

In this case, when other terminal apparatuses establish connections with the server 2, other terminal apparatuses may check their communication environment, and based on the communication environment, select addresses of the video clip data suitable for the communication environment from the network-address file. For example, when other terminal apparatuses determine that their communication environment is 3G, other terminal apparatuses may select one group of video clip data with smaller-volume from the network-address file; when other terminal apparatuses determine that their communication environment is Wifi, other terminal apparatuses may select one group of video clip data with larger-volume from the network-address file. After other terminal apparatuses have selected the corresponding one group of video clip data, other terminal apparatuses download sequentially from the server 2 and play the selected video clip data.

Below, with reference to FIG. 2, a video-data distribution method in accordance with an embodiment of the present invention will be described. Here, the method of FIG. 2 can be applied to the terminal apparatus shown in FIG. 1, which comprises a camera module, an encoding-and-packaging unit and a first communication unit.

Figure 2:
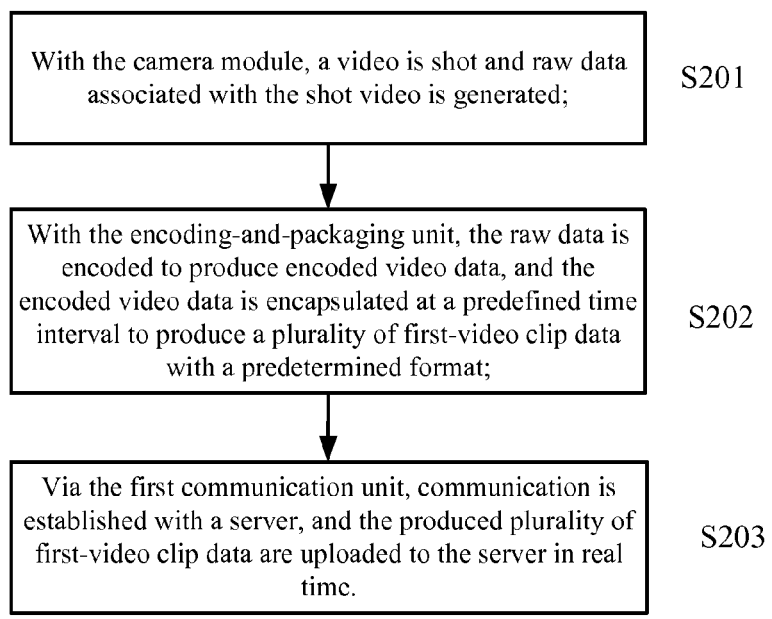
FIG. 2 is a flowchart illustrating a video distribution method in accordance with an embodiment of the present invention.

As shown in FIG. 2, at step S201, with the camera module, a video is shot and raw data associated with the shot video is generated.

Specifically, during video-shooting with the camera module 11, the camera module 11 can generate raw data associated with the shot video (including dynamic pictures and audios) in real time.

At step S202, with the encoding-and-packaging unit, the raw data is encoded to produce encoded video data, and the encoded video data is packaged at a predefined time interval to produce a plurality of first-video clip data with a predetermined format. Here, the produced plurality of first-video clip data can all be played independently.

Specifically, the encoding-and-packaging unit 12 may encode the raw data generated by the camera module 11, to produce encoded video data (e.g., video data based on H264 and AAC). In addition, the encoding-and-packaging unit 12 also may package the video data at a predefined time interval (e.g., 1 second), to produce the plurality of first-video clip data with a predetermined format. For example, the first-video clip data may be a streaming-media file, such as a TS file and the like. In this case, the data of each first-video clip among the plurality of first-video clip data produced by the encoding-and-packaging unit 12 can all be played independently by a terminal apparatus which supports a streaming-media-play function.

At step S203, via the first communication unit, communication is established with a server, and the produced plurality of first-video clip data is uploaded to the server in real time. Here, the server may be a HTTP server, and supports other terminal apparatuses to download the first-video clip data Specifically, the first processing unit 14 uploads the produced plurality of first-video clip data in real time (sequentially) to the server 2 via the first communication unit 13 such as a 3G module, a Wifi module and the like. Here, the server may be a HTTP server. The server supports other terminal apparatuses (e.g., PCs, TVs, laptops, tablets, mobile phones, etc.) to download and play the first-video clip data in the form of video-streaming data.

Here, the server may comprise: a second communication unit and a storage unit. In this case, the method of FIG. 2 may further comprise the following steps: the plurality of first-video clip data from the terminal apparatus is received via the second communication unit; when it is determined that the server receives first one of the first-video clip data from the terminal apparatus, the first one of the first-video clip data is stored in the storage unit, and a network-address file is generated for obtaining the first one of the first-video clip data as well as the subsequent first-video clip data; and the subsequent first-video clip data, received by the second communication unit, is stored in the storage unit.

Specifically, the second processing unit 23 of the server 2 receives the plurality of first-video clip data from the terminal apparatus 1 via the second communication unit 21. When the second processing unit 23 determines that the server 2 receives the first one of the first-video clip data from the terminal apparatus 1, the first one of the first-video clip data is stored in the storage unit 22, and a network-address file is generated for obtaining the first one of the first-video clip data as well as the subsequent first-video clip data, and the subsequent first-video clip data, received by the second communication unit 21, is stored in the storage unit 22. For example, when the second processing unit 23 determines that the server 2 receives the first one of the first-video clip data from the terminal apparatus 1, the second processing unit 23 stores the first one of the first-video clip data in the storage unit 22. At this point, the second processing unit 23, based on the received data of the initial one first-video clip, generates a network-address file (e.g., xxx.m3u8) for obtaining (downloading) the first one of the first-video clip data. Here, the network-address file may be a download-boot file like a M3U8 file, and in the download-boot file, there is contained a network address (i.e. a link, such as http://xxxxxx.com/1.TS) for obtaining the first one of the first-video clip data. Then, when the second processing unit 23 receives the subsequent first-video clip data, the second processing unit 23 stores the subsequent first-video clip data in the storage unit 22, and based on the received data of the subsequent first-video clip data, generates a network-address file for obtaining the first one of the first-video clip data as well as the subsequent first-video clip data. For example, the second processing unit 23 may generate the network-address file in such a way that the network addresses of the subsequent first-video clip data update the network-address file. In this case, the updated network-address file may contain the network addresses (e.g., http://xxxxxx.com/1.TS, http://xxxxxx.com/2.TS . . . ) of the first one of the first-video clip data as well as the subsequent first-video clip data; moreover, the sequence (the downloading or playing sequence) of the network addresses of the first one of the first-video clip data as well as the subsequent first-video clip data is consistent with the generation sequence of the first-video clip data.

In addition, the method shown in FIG. 2 may further comprise: the network-address file is sent to the terminal apparatus via the second communication unit; and the terminal apparatus sends the network address of the network-address file to at least one of predetermined other terminal apparatuses.

Specifically, the second processing unit 23 sends the network address (a link, such as http://xxxxxx.com/xxx.m3u8) of the network-address file to the terminal apparatus 1 via the second communication unit 21. In this case, the terminal apparatus 1 may send the network address of the network-address file to at least one of predetermined other terminal apparatuses. For example, after the terminal apparatus 1 receives the network address of the network-address file, the first processing unit 14 may, via the display screen (not shown) of the terminal apparatus 1, display contact information such as contacts, microblog friends, QQ friends and the like information for a user to select, and after the user's selection, the network address of the network-address file is sent (e.g., in the form of SMS or qq messages) to a specified other user (terminal apparatus) via the first communication unit 13.

In addition, the method shown in FIG. 2 may further comprise: the network address of the network-address file is sent to at least one of predetermined other terminal apparatuses via the second communication unit.

Specifically, with the use of push technology, the server 2 sends the network address of the network-address file to at least one of predetermined other terminal apparatuses. For example, the user of the terminal apparatus 1 may upload a specified contact list or friends list through the terminal apparatus 1 to the server 2 in advance. In this case, when the server 2 receives the first one of the first-video clip data from terminal apparatus 1, the server 2 may, based on the acquired identification (ID) of the terminal apparatus 1 or the identification of the uploader when establishing connection with the terminal apparatus 1, determine a corresponding contact list or friends list, and after the second processing unit 23 has generated a network-address file, the second processing unit 23 may push the network address of the network-address file to at least one of predetermined other terminal apparatuses among the contact list or friends list, via the second communication unit 21.

Then, the method shown in FIG. 2 may further comprise: other terminal apparatuses, based on the network-address file, download sequentially from the server and play the first-video clip data.

Specifically, after the network address of the network-address file is pushed by the server 2 directly or sent through the terminal apparatus 1 to at least one of other terminal apparatuses, the other terminal apparatuses may, based on the network address of the network-address file, obtain the network-address file, and may, based on the network-address file, download sequentially from the server 2 and play the plurality of first-video clip data. Specifically, when the users of other terminal apparatuses have selected the network address of the network-address file, other terminal apparatuses then, based on the network address of the network-address file, obtain the network-address file, and obtain the network addresses of the plurality of first-video clip data contained in the network-address file, and further based on the network addresses of the plurality of first-video clip data, download sequentially from the server 2 and play the plurality of first-video clip data in the form of streaming media. Here, since the plurality of first-video clip data is downloaded and played in the form of streaming media, other terminal apparatuses need to poll the server 2 whether or not the playing of the video has completed. For example, other terminal apparatuses check (poll) at a predefined time interval whether or not there is new content in the network-address file; if there are network addresses of new first-video data, then other terminal apparatuses continue to play the video until the playing of all first-video data in the network-address is completed.

In the way described above, since the user of the terminal apparatus 1 generates first-video data at a predetermined short time interval (e.g., 1 second) during shooting and uploads the first-video data, and the second processing unit 23 of the server 2 generates a network-address file based on the first-video data and transmits the network address of the network-address file directly (or through the terminal apparatus 1) to other terminal apparatuses, thus the users of other terminal apparatuses only need to wait a very short period of time to be able to watch the video shot by the terminal apparatus 1, without the need of waiting until the user of the terminal apparatus 1 completes shooting. In this case, such a function is achieved that users of other terminal apparatuses watch the live-playing videos of the terminal apparatus 1, and user-experience is greatly improved.

In addition, according to an embodiment of the present invention, the method of FIG. 2 may further comprise: based on the first-video clip data, second-video clip data is produced with a different bitrate, and based on the first-video clip data as well as the second-video clip data, a network-address file is generated. Then, other terminal apparatuses, based on a communication environment, select addresses of the video clip data suitable for the communication environment from the network-address file, and download sequentially from the server and play the selected video clip data.

Specifically, the second processing unit 23 also may, based on the first-video clip data, produce the second-video clip data with a different bitrate, and based on the first-video clip data as well as the second-video clip data, generate a network-address file. Here, the first-video clip data and the corresponding second-video clip data have the same content. For example, if the first-video clip data are high-definition videos, then, in order to meet the needs of a different communication environment of other terminal apparatuses, the second processing unit 23 also converts the first-video clip data (e.g., 720 P) into the second-video clip data with a different bitrate (e.g., 480 P). In addition, for example, if the first-video clip data are standard-definition videos, then the second processing unit 23 also may convert the first-video clip data (e.g., 480 P) into the second-video clip data with a different bitrate (e.g., 720 P). Then, the second processing unit 23, based on the first-video clip data as well as the second-video clip data, generates a network-address file. For example, in the network-address file, there may contain network addresses of the data of two groups of video clips (the first-video clip data and the second-video clip data). In this case, when other terminal apparatuses establish connections with the server 2, other terminal apparatuses may check their communication environment, and based on the communication environment, select addresses of the video clip data suitable for the communication environment from the network-address file. For example, when other terminal apparatuses determine that their communication environment is 3G, other terminal apparatuses may select the data of one smaller-volume group of video clips from the network-address file; when other terminal apparatuses determine that their communication environment is Wifi, other terminal apparatuses may select the data of one larger-volume group of video clips from the network-address file. After other terminal apparatuses have selected the data of one corresponding group of video clips, other terminal apparatuses download sequentially from the server 2 and play the selected video clip data.

The above has described various embodiments of the present invention in detail. However, it should be understood by the skilled in the art, without departing from the principle and spirit of the present invention, various modifications, combinations or sub-combinations can be made to these embodiments, and such modifications shall fall in the scope of the present invention.

The invention claimed is:

1. A terminal apparatus, comprising:
   a camera module, configured to shoot a video, and generate raw data associated with the shot video in real time;
   an encoding-and-packaging unit, configured to encode the raw data to produce encoded video data, and package the video data at a predefined time interval to produce a plurality of first-video clip data with a predetermined format, wherein the plurality of first-video clip data can all be played independently and the plurality of first-video clip data is discontinuous in time domain;
   a first communication unit, configured to communicate with a remote server, wherein the server is a hypertext-transfer-protocol server and supports other terminal apparatuses to download the first-video clip data; and
   a first processing unit, configured to upload the produced plurality of first-video clip data to the server in real time via the first communication unit, wherein the plurality of first video clip data corresponds to a network address file containing different addresses for the plurality of first video clip data respectively.

2. The terminal apparatus according to claim 1, wherein, the server further comprises:
   a second communication unit, configured to communicate with the terminal apparatus, and receive the plurality of first-video clip data from the terminal apparatus;
   a storage unit, configured to store the plurality of first-video clip data; and
   a second processing unit, configured to store first one of the first-video clip data in the storage unit when it is determined that the server receives the first one of the first-video clip data from the terminal apparatus, and generate the network-address file for obtaining the first one of the first-video clip data as well as the subsequent first-video clip data, and store the subsequent first-video clip data, received by the second communication unit, in the storage unit.

3. The terminal apparatus according to claim 2, wherein,
the second processing unit of the server sends the network addresses of the network-address file to the terminal apparatus via the second communication unit; and
the terminal apparatus sends the network addresses of the network-address file to at least one of predetermined other terminal apparatuses.

4. The terminal apparatus according to claim 3, wherein,
the other terminal apparatuses, based on the network-address file, download sequentially from the server and play the plurality of first-video clip data.

5. The terminal apparatus according to claim 4, wherein,
the second processing unit, based on the first-video clip data, produces second-video clip data with a different bitrate, and based on the first-video clip data as well as the second-video clip data, generates the network-address file, wherein, the first-video clip data and the corresponding second-video clip data have the same content; and
the other terminal apparatuses, based on a communication environment, select addresses of the video clip data suitable for the communication environment from the network-address file, and download sequentially from the server and play the selected video clip data.

6. The terminal apparatus according to claim 2, wherein,
the second processing unit of the server sends the network addresses of the network-address file to at least one of predetermined other terminal apparatuses via the second communication unit.

7. The terminal apparatus according to claim 6, wherein,
the other terminal apparatuses, based on the network-address file, download sequentially from the server and play the plurality of first-video clip data.

8. The terminal apparatus according to claim 7, wherein,
the second processing unit, based on the first-video clip data, produces second-video clip data with a different bitrate, and based on the first-video clip data as well as the second-video clip data, generates the network-address file, wherein, the first-video clip data and the corresponding second-video clip data have the same content; and
the other terminal apparatuses, based on a communication environment, select addresses of the video clip data suitable for the communication environment from the network-address file, and download sequentially from the server and play the selected video clip data.

9. A video-data distribution method, applied to a terminal apparatus comprising a camera module, an encoding-and-packaging unit and a first communication unit, the method comprising:
with the camera module, a video is shot and raw data associated with the shot video is generated;
with the encoding-and-packaging unit, the raw data is encoded to produce encoded video data, and the encoded video data is packaged at a predefined time interval to produce a plurality of first-video clip data with a predetermined format, wherein the plurality of first-video clip data can all be played independently; and the plurality of first-video clip data is discontinuous in time domain and via the first communication unit, communication is established with a server, and the produced plurality of first-video clip data is uploaded to the server in real time, wherein the server is a hypertext-transfer-protocol server and supports other terminal apparatuses to download the first-video clip data, wherein the plurality of first video clip data corresponds to a network address file containing different addresses for the plurality of first video clip data respectively.

10. The method according to claim 9, wherein the server further comprises a second communication unit and a storage unit, the method further comprising:
the plurality of first-video clip data from the terminal apparatus is received via the second communication unit;
when it is determined that the server receives first one of the first-video clip data from the terminal apparatus, the first one of the first-video clip data is stored in the storage unit, and the network-address file is generated for obtaining the first one of the first-video clip data as well as the subsequent first-video clip data; and
the subsequent first-video clip data, received by the second communication unit, is stored in the storage unit.

11. The method according to claim 10, further comprising:
the network addresses of the network-address file are sent to the terminal apparatus via the second communication unit; and
the terminal apparatus sends the network address of the network-address file to at least one of predetermined other terminal apparatuses.

12. The method according to claim 11, further comprising:
the other terminal apparatuses, based on the network-address file, download sequentially from the server and play the first-video clip data.

13. The method according to claim 12, further comprising:
based on the first-video clip data, second-video clip data is produced with a different bitrate, and based on the first-video clip data as well as the second-video clip data, the network-address file is generated, wherein, the first-video clip data and the corresponding second-video clip data have the same content; and
the other terminal apparatuses, based on a communication environment, select addresses of the video clip data suitable for the communication environment from the network-address file, and download sequentially from the server and play the selected video clip data.

14. The method according to claim 10, further comprising:
the network addresses of the network-address file are sent to at least one of predetermined other terminal apparatuses via the second communication unit.

15. The method according to claim 14, further comprising:
the other terminal apparatuses, based on the network-address file, download sequentially from the server and play the first-video clip data.

16. The method according to claim 15, further comprising:
based on the first-video clip data, second-video clip data is produced with a different bitrate, and based on the first-video clip data as well as the second-video clip data, the network-address file is generated, wherein, the first-video clip data and the corresponding second-video clip data have the same content; and
the other terminal apparatuses, based on a communication environment, select addresses of the video clip data suitable for the communication environment from the network-address file, and download sequentially from the server and play the selected video clip data.

* * * * *